No. 747,422. PATENTED DEC. 22, 1903.
C. B. HELM.
CARTRIDGE LOADING DEVICE.
APPLICATION FILED DEC. 23, 1902.
NO MODEL. 3 SHEETS—SHEET 1.

Witness:
F. W. H. Clay
Chas. H. Ebert

Inventor:
Clinton B. Helm
By Paul Synnestvedt
Attorney.

No. 747,422. PATENTED DEC. 22, 1903.
C. B. HELM.
CARTRIDGE LOADING DEVICE.
APPLICATION FILED DEC. 23, 1902.
NO MODEL. 3 SHEETS—SHEET 2.
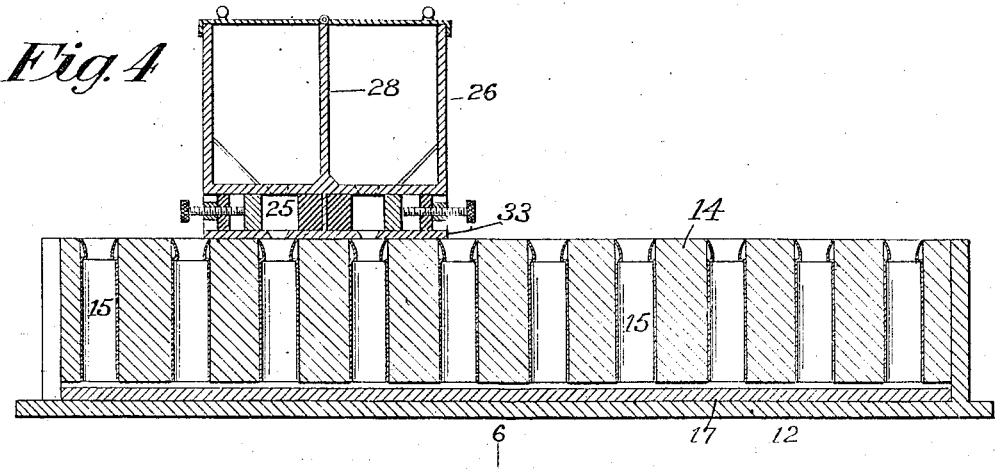
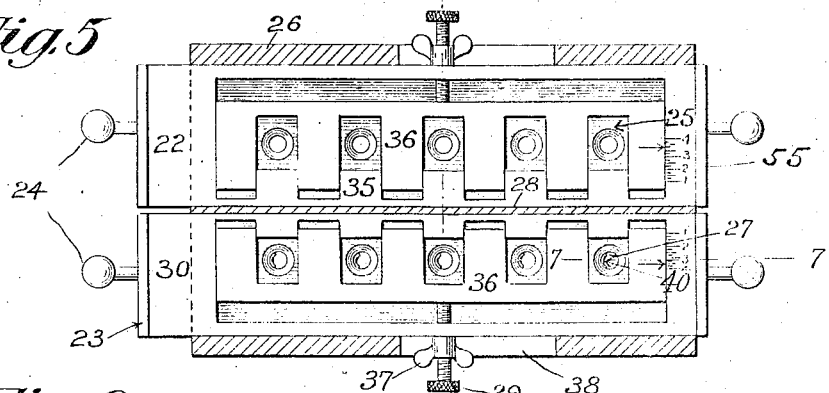
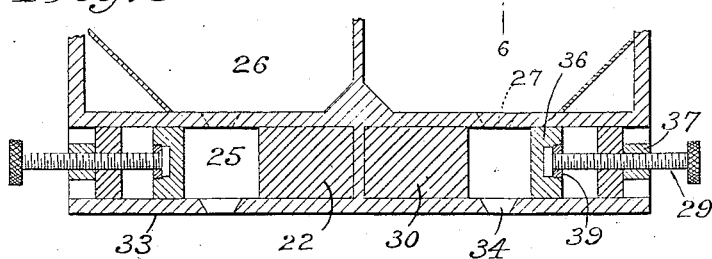
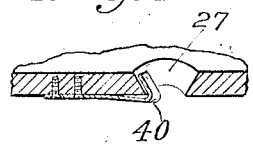
Witnesses:
F. W. H. Clay
Chas. H. Eberk
Inventor:
Clinton B. Helm
By
Paul Synnestvedt
Attorney.

No. 747,422. PATENTED DEC. 22, 1903.
C. B. HELM.
CARTRIDGE LOADING DEVICE.
APPLICATION FILED DEC. 23, 1902.
NO MODEL. 3 SHEETS—SHEET 3.

Witness:
F. W. H. Clay
Chas. H. Ebert

Inventor:
Clinton B. Helm
By Paul Synnestvedt
Attorney.

No. 747,422. Patented December 22, 1903.

UNITED STATES PATENT OFFICE.

CLINTON B. HELM, OF ROCKFORD, ILLINOIS, ASSIGNOR TO AMERICA COMPANY, OF ROCKFORD, ILLINOIS, A CORPORATION OF ILLINOIS.

CARTRIDGE-LOADING DEVICE.

SPECIFICATION forming part of Letters Patent No. 747,422, dated December 22, 1903.

Application filed December 23, 1902. Serial No. 136,413. (No model.)

*To all whom it may concern:*

Be it known that I, CLINTON B. HELM, a citizen of the United States of America, and a resident of Rockford, in the State of Illinois, have invented a certain new and useful Cartridge-Loading Device, of which the following is a specification.

My invention relates to apparatus for loading cartridges for shot guns and other small arms; its principal objects being to provide a compact and accurate means for loading a series of shells at once; to provide automatic means for measuring and discharging into the shell a definite volume of material for the charge; to provide for the easy handling of the shells; to provide an accurate graduating adjustment for the measuring compartments; to provide for easy manipulation of the powder and shot charges; and in general, to provide an accurately working and convenient mechanism for loading shells not requiring any lifting of the parts and avoiding the necessity for painstaking attention to the filling of the measure. The invention also provides various structural improvements of parts and convenient arrangements whereby the operation is simplified.

The above objects of the invention, as well as other advantages which will hereinafter appear, I attain by the apparatus which I have illustrated in preferred form in the drawings accompanying and forming part of this specification, wherein,—

Figure 4 is a vertical longitudinal section, taken along line 4—4 of Figure 1.

Figure 5 is an enlarged horizontal section through the hopper, on line 5—5 of Figure 2, showing the adjustable charge blocks in plan.

Figure 6 is a central vertical section similar to that of Figure 4, taken on line 6—6 in Figure 5 and enlarged.

Figure 7 is a partial vertical section through the bottom of the measuring compartment taken on line 7—7 of Figure 5 illustrating a spring side of the opening in the hopper used for shot.

Figure 9 being a plan, Figure 10 a vertical cross-section on line 10, 10, of Figure 9, and Figure 11 being a plan view of the charge block thereof.

Figure 1:
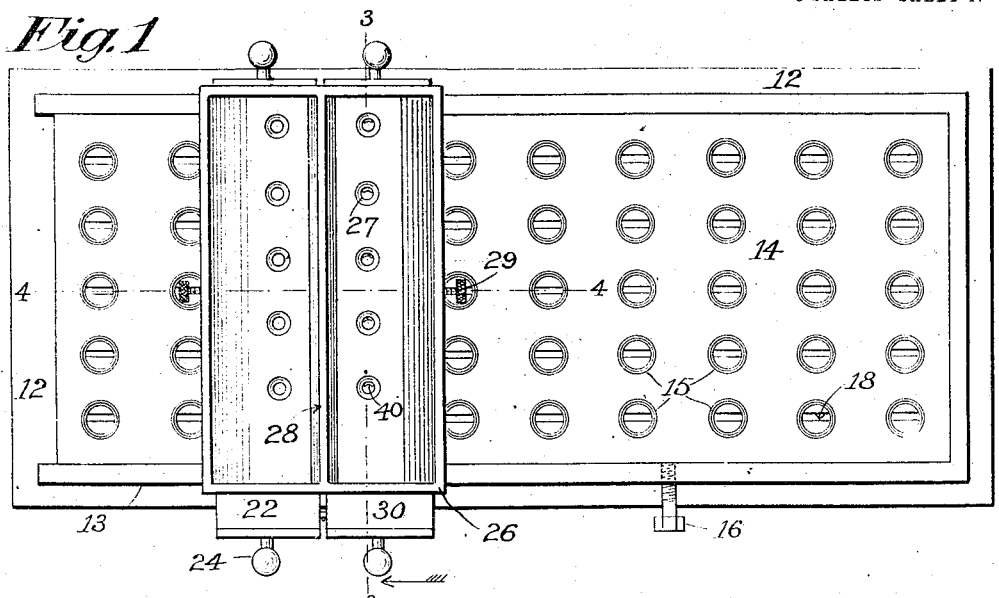
Figure 1 is a plan view of the device as adapted for loading shot gun cartridges five at a time.
Figure 2:
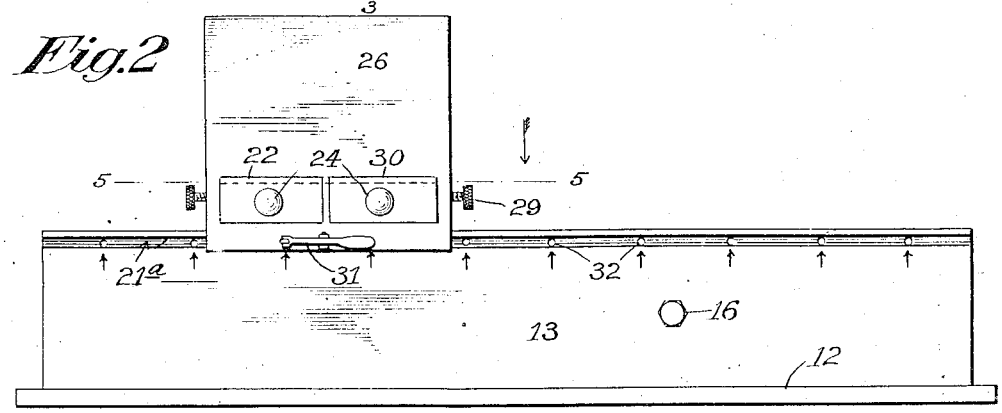
Figure 2 is a side elevation of the same.

A base 12, which may be conveniently a table top or may be portable, is provided with sides 13 within which slides the shell block 14. This shell block is of a sufficient height to take in the shells in the holes 15, which may conveniently be lined with metal as shown. The shell block has a removable bottom 17 provided with pins 19 to register in holes in the block, and provided also with grooves 18, so that the cap of the shell will not be in contact with the bottom board. The block 14 may be easily slid into the sides 13 and held in place by the screw 16.

A hopper 26 which I conveniently make in two compartments separated by a partition 28, rests upon the sides 13, and when the shell block is in place the latter fits close against the bottom of the hopper. The hopper is provided with inturned flanges 21 which slide in grooves 21ª in the sides 13; it is also provided with a catch-pin 31 which registers with holes 32 in the sides 13, in position to bring the openings of the hopper directly over the holes 15 of the shell block on any row desired. The hopper is provided with a bottom proper having feeding apertures 27, and a second partition below the first which rests directly upon the sides 13 and the shell block and has outlet holes 34, out of register with the holes 27, but registering with the opening 15 containing the shells. Resting immediately upon the bottom or partition 33 are the charge blocks. These, as shown in Figure 5, are two in number, one on each side of the partition 28 of the hopper, the hopper being provided with two compartments, one for powder and one for shot. The charge blocks 22 and 30 respectively under the powder and shot compartments, slide bodily side-to-side under the hopper to bring the charge compartments 25 alternately in register with the holes in the bottoms of the hopper, 27, and the openings 34 of the partition 33. The charge blocks are prevented from removal by the stop flanges 23, and are handled by means of the knobs 24. These charge blocks, 22, 30, are composed of telescoping notched sections, the fingers 36 being movable between the fingers 35 in order to alter the volume of the charge openings or compartments 25, and the fingers 36 are movable by means of the adjusting screw 29, and held in place by the lock nut 37, which slides in the slots 38 in the side of the hopper 26, all as will be plain from Figure 5. At the side of the charge block I provide a scale 55 to accurately measure and adjust the volume of the charge compartments. One of these charge blocks, 30, is under the shot compartment of the hopper and the holes 27 thereover are provided on their sides and under the same with a spring portion 40, as shown in Figure 7, for the purpose of preventing the shot from jamming against the upper edge of the charge block, as the latter slides under the bottom of the hopper in its cut-off action.

Figure 9:
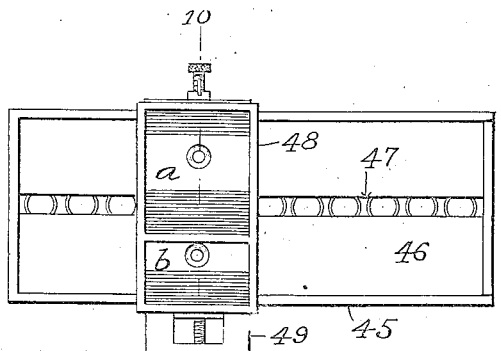
Figures 9, 10 and 11 illustrate a modification of the device used in loading rifle cartridges with two kinds of powder.
Figure 10:
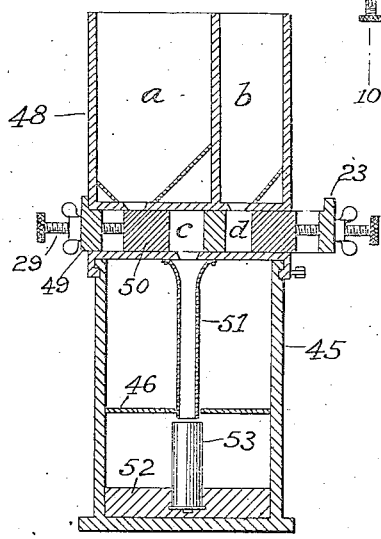
Figure 11:
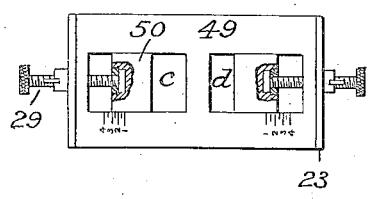

In loading rifle cartridges it frequently happens that an explosive charge composed of a small portion of rapidly burning powder is used next to the cap and the larger charge of slow burning powder above the same; and for this purpose I arrange the apparatus as shown in Figures 9, 10 and 11. The hopper 48 has the two compartments a and b, and the charge block 49 has the two compartments c and d, respectively adjusted by means of the blocks 50 carried on the screws 29. The hopper may be mounted as before upon the sides of a box 45. In loading rifle cartridges I find it advantageous to allow the powder a considerable fall as it is dumped into the shell, in order to pack it well in place: for this purpose, instead of dumping the charges from the compartments c, d, directly into the shell 53, I provide a funnel-mouthed tube 51 of some length, which may be attached to the bottom of the hopper while the shells are carried in a slot in the block 52 below it. The partition 46 with slot 47 is convenient for guiding and supporting the tube 51 as the hopper slides along the sides of the box to supply successive shells. The charge block in this case may slide sidewise between the two bottoms of the hopper in the same manner as in Figure 1, and the adjustment blocks thereof are likewise provided with scales for graduating the amount of the charges. It will be seen that as the charge block alternates from side to side it will alternately dump into the tube 51 a charge from the respective compartments a and b from the hopper.

The hopper may conveniently in some cases be provided with a hinged cover as shown in Figure 4. It is evident that the charge blocks may be arranged to slide in either direction between the two bottoms of the hopper by arranging the telescoping parts of the charge block lengthwise of the block.

Figure 3:
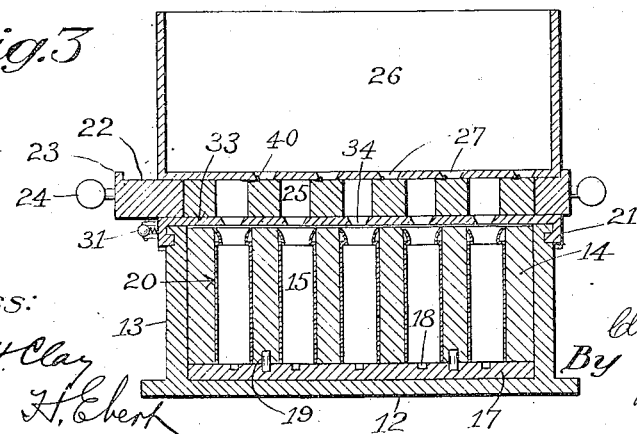
Figure 3 is a vertical cross-section taken along line 3—3 of Figure 1.
Figure 8:
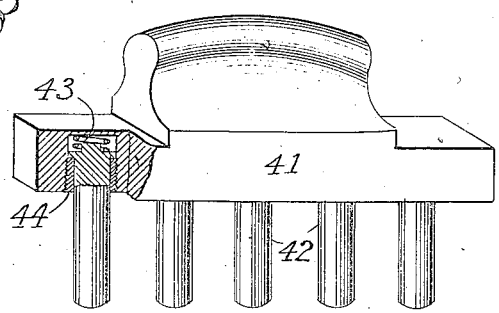
Figure 8 is a perspective view, and partial section, of a convenient form of wad rammer which I use.

The operation of the device will be plain from the above description. The shells being inserted in the block 14 and the bottom 17 thereof put in place, and the block being inserted in the box 12, 13, the hopper will be slid sidewise on the sides 13 so that the catch 31 registers with one of the holes 32, first in position to bring charge block 22 over one of the rows of shells. A sidewise motion of the charge block 22 will measure off the required charge of powder and its return to the position shown in Figure 3 will discharge the powder into the shell. Thus the entire row of shells may be loaded, when the wads are put in by the rammer 41 and a similar process repeated, registering the openings of the shot compartment and charge block 30, over the successive rows of shells. The amounts of the charges may be accurately graduated at will by merely turning the screws 29, which it will be observed can be done at any time without removing any of the parts, since when the blocks 22, 30, are shoved over to the right in order to receive the charges, the scales 51 are exposed to view, and the charges for each row may be adjusted differently as they are measured off; so that different charges may be deposited in the different rows of shells when desired. The convenient arrangement of the graduating scales on the two charge blocks side by side and in plain view, lessens the liability of erroneously proportioning the respective charges; and the provision of the horizontal adjustment for the volumes of the charge compartments renders it unnecessary to provide any removable parts of the device and avoids the trouble of lifting or altering the position of the hopper. Other advantages of the arrangement of parts will readily occur to those skilled in the use of such devices.

Having thus described my invention and illustrated its use, what I claim, and desire to secure by Letters Patent, is the following:

1. A cartridge loading device comprising a shell holder, a movable hopper thereon supported independently of the shell holder provided with a double perforated bottom, and a shifting charge block having adjustable compartments for measuring off and dumping into the shells in the holder a regulable charge.

2. A cartridge loading device comprising a box with a removable shell holder, a hopper supported on the sides of said box, shiftable along the same to register with the shells in said holder and provided with a charge block having means for horizontal adjustment of the capacity of measuring compartment therein.

3. The combination with a supporting box, and a removable perforated shell holding block therein, of a hopper slidably resting upon the sides of the box over the shell block provided with two compartments and a shifting charge block under each compartment, said charge blocks having means for horizontal adjustment of the charge compartments therein, whereby the volume of charge may be changed without lifting the hopper or removing any of the parts.

4. In a loading device a hopper provided with two perforated bottom partitions having a shiftable charge block between the partitions, said charge block being provided with compartments adjustable in volume by sidewise movement of the parts thereof.

5. In a loading device, the combination with a shiftable hopper having a double perforated bottom, of a charge block between the partitions of the bottom composed of telescoping parts forming compartments and having means for horizontal shifting of the telescoping parts to adjust the volume of the compartments.

6. In a loading device the combination with a loading hopper having a double bottom with perforations out of register, of a charge block composed of two notched pieces with telescoping fingers, one of said notched pieces being mounted for horizontal adjustment by means of a screw, and the whole charge block being shiftable to bring the compartments alternately in register with the respective perforations of the two partitions forming the bottom of the hopper.

7. In a loading device in combination with a shell holder, a hopper having two compartments and provided with two shifting charge blocks thereunder, said charge blocks having adjustable compartments and provided with a scale for graduating the volume of the compartments.

8. In a loading device the combination with a shell holder and a shiftable hopper, of a charge block having two adjustable compartments therein and means for alternately loading and dumping said compartments by shifting the block, substantially as described.

9. A cartridge loading device comprising a retaining box, a shell block removably held in said box, a hopper shiftably resting on the sides of the box over the shell block, means for adjusting the position of the hopper to register with the shells in the shell block, and adjustable means for measuring and discharging a charge from the hopper into the shells.

10. In a loading device the combination with a box containing a shell holder, of a shiftable hopper mounted on the sides of the box and provided with two compartments and a laterally shifting charge block with laterally adjustable measuring compartments, and a packing tube leading from the outlet of the measuring compartment to the shell to be loaded, substantially as described.

11. The combination of a perforated shell block, a shiftable hopper having two compartments, supports for said hopper provided with means for adjusting the position of the hopper upon the shell block, two charge blocks laterally shiftable under the bottom of the hopper, means for adjusting laterally the compartments in the charge block, comprising a telescoping section of the charge block provided with a graduating scale thereon, substantially as described.

12. In loading apparatus a composite charge block having measuring compartments inclosed by the parts thereof and means for shifting all parts simultaneously to alter the capacity of said compartments, and a scale for measuring the common capacity of compartments.

13. In loading apparatus the combination with a perforated bottom of a hopper and a charge block sliding closely against the same, of a spring buffer embracing the edge of the perforations in the bottom of the hopper and designed to give as the block slides under the said perforations in order to prevent choking, substantially as described.

In testimony whereof I have hereunto set my hand in the presence of the subscribed witnesses.

CLINTON B. HELM.

Witnesses:
W. C. GREEN,
WM. J. H. STRONG.